United States Patent
Engelbart et al.

(10) Patent No.: US 7,626,692 B2
(45) Date of Patent: Dec. 1, 2009

(54) AUTOMATED IMAGING OF PART INCONSISTENCIES

(75) Inventors: Roger W. Engelbart, St. Louis, MO (US); Ron Newcomer, Ballwin, MO (US); John R. Dworschak, Wildwood, MO (US); Douglas D. Trimble, Saint Peters, MO (US); Richard J. Steckel, Washington, MO (US); Christopher M. Vaccaro, O'Fallon, MO (US); William A. Lane, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 11/612,379

(22) Filed: Dec. 18, 2006

(65) Prior Publication Data
US 2008/0141777 A1    Jun. 19, 2008

(51) Int. Cl.
*G01N 21/00* (2006.01)
(52) U.S. Cl. .................. 356/237.1; 356/237.2; 382/141
(58) Field of Classification Search ... 356/237.1–237.5; 73/40.5, 866.5, 886.8, 598; 324/228, 237, 324/238; 382/141
See application file for complete search history.

(56) References Cited

U.S. PATENT DOCUMENTS

| | | | | |
|---|---|---|---|---|
| 3,213,677 A | | 10/1965 | Maklary | |
| 4,093,382 A | * | 6/1978 | Kurtz | 356/72 |
| 4,222,273 A | * | 9/1980 | Takahashi et al. | 73/603 |
| 4,476,434 A | * | 10/1984 | Collins et al. | 324/233 |
| 4,719,801 A | * | 1/1988 | Blaser et al. | 73/592 |
| 4,901,576 A | * | 2/1990 | Rademacher | 73/592 |
| 6,327,921 B1 | * | 12/2001 | Hsu et al. | 73/866.5 |
| 7,193,696 B2 | | 3/2007 | Engelbart et al. | |
| 7,272,253 B2 | * | 9/2007 | Katsuta et al. | 382/141 |
| 7,489,392 B2 | | 2/2009 | Engelbart et al. | |
| 7,508,971 B2 | | 3/2009 | Vaccaro et al. | |
| 2006/0053867 A1 | * | 3/2006 | Stumpf | 73/40.5 A |
| 2007/0034313 A1 | | 2/2007 | Engelbart et al. | |

FOREIGN PATENT DOCUMENTS

FR    2879292    6/2006

OTHER PUBLICATIONS

The Boeing Company, PCT/US2007/087809 mailed Apr. 22, 2008.

* cited by examiner

*Primary Examiner*—Hoa Q Pham
(74) *Attorney, Agent, or Firm*—Rozenblat IP LLC

(57) ABSTRACT

The embodiments of the disclosure relate to a method of displaying an image of an inconsistency on a part. The part may be scanned. An inconsistency on the part may be located. An image of the inconsistency may be displayed on the part. In other embodiments, parts are provided which had images of the parts' inconsistencies displayed on one or more surfaces of the parts.

21 Claims, 2 Drawing Sheets

AUTOMATED IMAGING OF PART INCONSISTENCIES

BACKGROUND

A wide variety of nondestructive evaluation methods (non-destructive inspection NDI), such as ultrasonics, eddy current, x-ray, magnetic resonance, and microwave, have been utilized to inspect post-manufacture parts, which may comprise metal and/or composite and/or ceramic parts or other types of parts. Both water-based, gantry-style systems and portable instruments have been utilized to conduct this evaluation. Some of the prior art methods conduct scans of the post-manufacture parts, and then print out full-scale paper plots of the parts or the inconsistency areas which are then aligned over the parts in order to repair the part inconsistencies. Sometimes, the inconsistency areas of the printed plot are cut-out in order to trace the inconsistencies on the parts. Other methods overlay the printed plot with a transparent Mylar sheet in order to trace the outlines of any inconsistencies on the Mylar, which is then laid over the part in order to trace the inconsistencies onto the part for repair of the inconsistencies. One or more of these methods may be costly, may take substantial time, may be difficult to administer, may be inefficient, may be inconsistent, may lead to error, may not allow for repeatability, and/or may experience other types of problems.

An inspection process is needed which may solve or reduce one or more problems associated with one or more of the prior art methods.

SUMMARY

In one aspect of the disclosure, a method of displaying an image of an inconsistency on a part is provided. In one step, the part is scanned (NDI) for inconsistencies. In another step, the inconsistency on the part is located. In still another step, the image of the inconsistency is displayed on the part.

In another aspect of the disclosure, another method of displaying an image of an inconsistency on a part is provided. In one step, locations of reference points located on the part are determined. In another step, the part is scanned (NDI) for inconsistencies utilizing at least one of a non-destructive device. In still another step, the inconsistency in and/or on the part is located. In yet another step, the image of the inconsistency is displayed on the part.

In a further aspect of the disclosure, a part is provided which had a laser image of an inconsistency displayed on the part. The part was non-destructively scanned (NDI), and the inconsistency was located. Coordinates of the inconsistency were provided to a laser projection device which displayed the laser image on the part.

These and other features, aspects and advantages of the disclosure will become better understood with reference to the following drawings, description and claims.

DETAILED DESCRIPTION

The following detailed description is of the best currently contemplated modes of carrying out embodiments of the disclosure. The description is not to be taken in a limiting sense, but is made merely for the purpose of illustrating the general principles of embodiments of the disclosure, since the scope of the embodiments is best defined by the appended claims.

Figure 1:
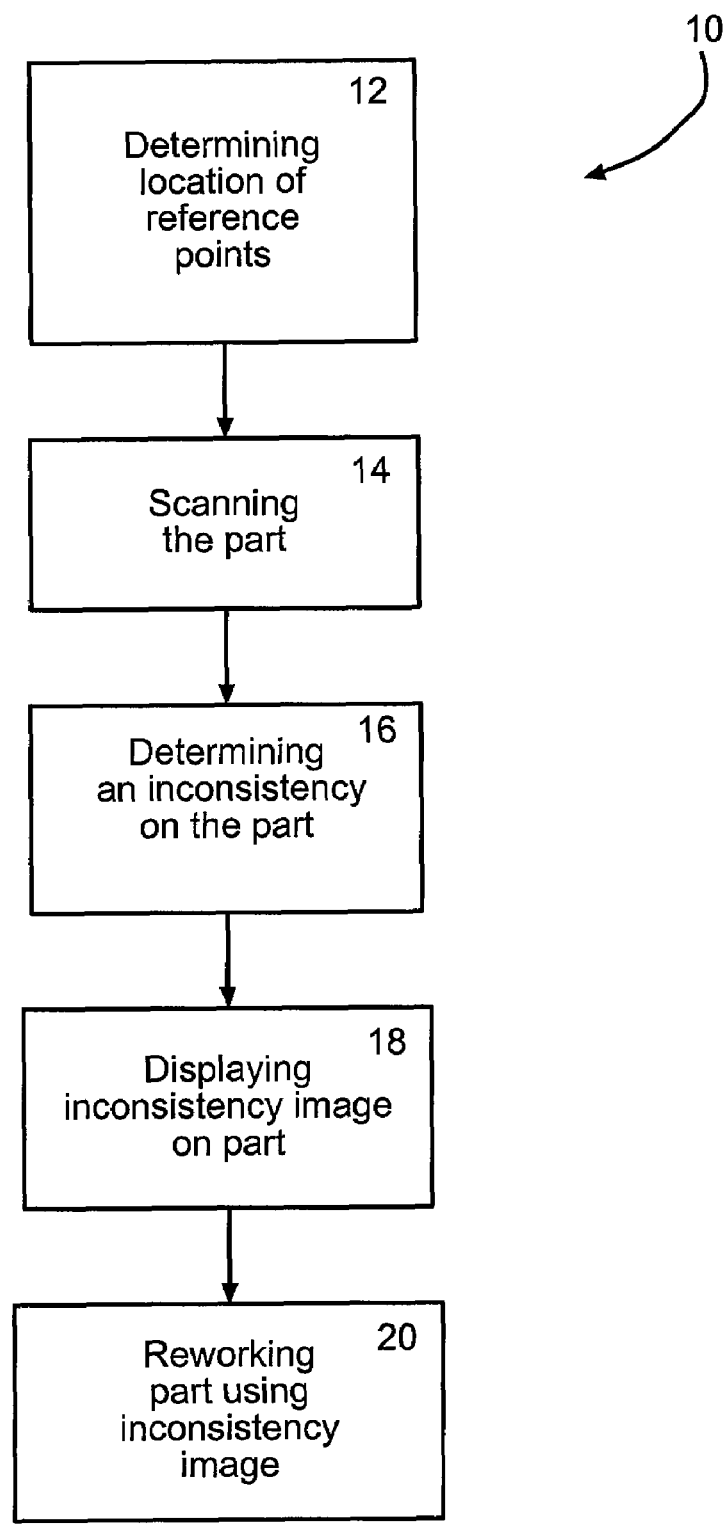
FIG. 1 illustrates a flow-chart of one embodiment of the disclosure of a method of displaying an image of an inconsistency on a part.

In one embodiment of a method, as depicted in FIG. 1, a method 10 of displaying an image of an inconsistency on a part, component, or structure is provided. The method may be automated, and/or may utilize for example, without limitation, software and/or hardware such as one or more computers. The part may comprise a vehicle part such as, but not limited to, an aircraft, auto, bus, train, ship or satellite part. In other embodiments, the part may comprise any type of part, including non-aeronautical related parts, which are made of metal and/composites and/or ceramic or other materials. "Inconsistencies," as the term is used in the appropriate context throughout this disclosure, refers to the difference between one or more measured characteristics of a composite structure under test (and potentially effected by exposure to factor(s) including, but not limited to, thermal load(s), moisture, galvanic action, structural load(s), lightning, or electrical arcing) with expected values for the same characteristics of an analogous composite structure unaffected by exposure to those factors.

Figure 2:
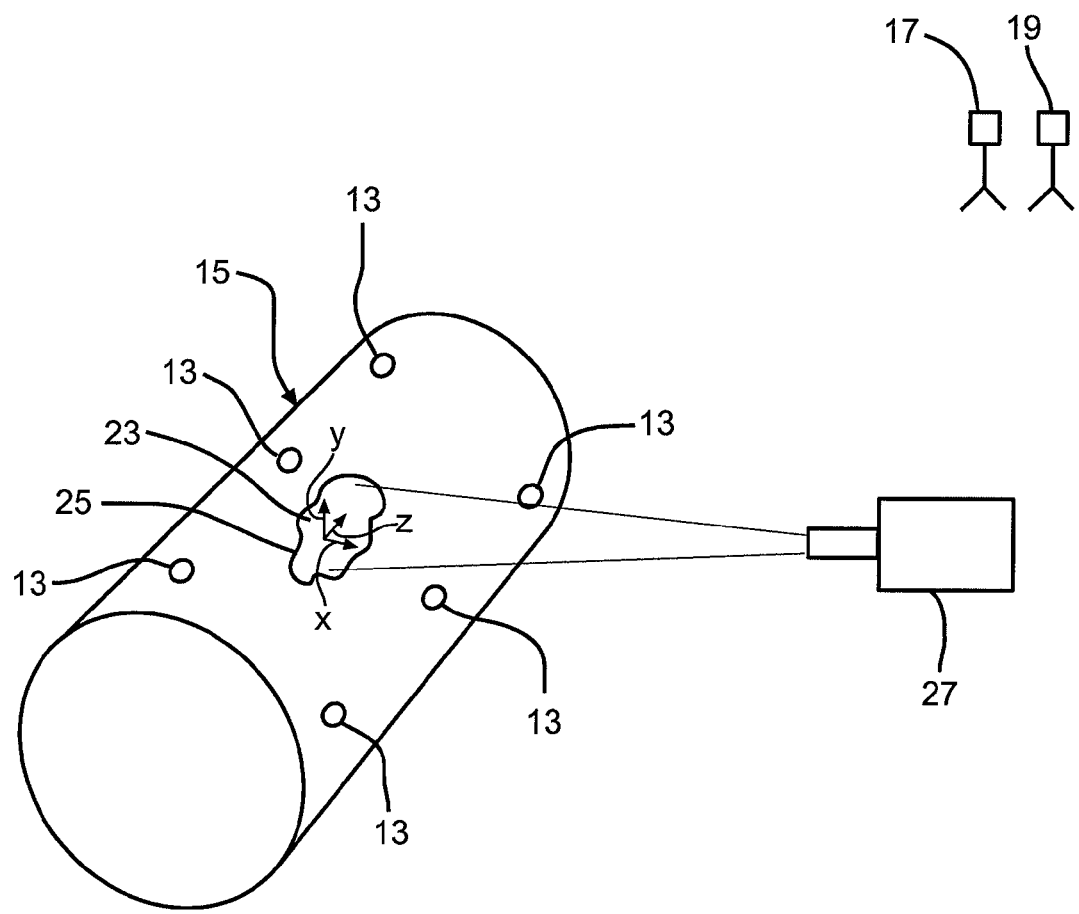
FIG. 2 illustrates a perspective view of one embodiment of the disclosure of an inconsistency being located on a part and an image of the inconsistency being displayed on the part.

As shown in FIGS. 1 and 2, in step 12, a determination may be made as to locations of reference points 13 located on the part 15. In one embodiment, up to six reference points 13 may be located on the part. Figure illustrates 6 reference points 13. The reference points 13 may comprise reflective markers, such as without limitation reflective tape, and or reflective targets which are dispersed over various locations of the part. These locations may or may not be pre-determined. In other embodiments, any number, type, configuration, size, and/or location of reference points 13 may be utilized. The determination as to the locations of the reference points 13 on the part 15 may be made utilizing a light emitting device 17, such as without limitation a photogrammetry device, and/or a laser emitting device 19, such as without limitation a laser tracker, which may reflect light and/or laser beams off the reference points 13. The locations, configurations, and/or magnitudes of the reflected light and/or laser beams may then be determined in order to determine the locations of the reference points on the part. In other embodiments, the determination as to the locations of the reference points 13 on the part 15 may be made utilizing any type of device known in the art including without limitation a printer.

In step 14, the part 15 may be scanned (non-destructively inspected NDI) for inconsistencies. The part 15 may be scanned utilizing any type of non-destructive scanning device 21 known in the art, such as, but not limited to the use of an ultrasonic scanning device, an infrared scanning device, a magnetic resonance scanning device, or X-ray scanning device. The scan of the part may include taking ultrasonic images of the entire part, including the locations of the part where the reference points may be located. In such manner, images, data, and/or information regarding the part's shape and/or depth may be obtained. In other embodiments, the scan of the part may comprise only certain areas of the part, and/or other information regarding the part.

In step 16, an inconsistency 23 on the part 15 may be determined. This step may comprise determining one or more coordinate X, Y, and Z locations of one or more inconsistencies 23 on the part 15. The location of any inconsistencies may be determined by comparing the data and/or information obtained from the scan of the part to the locations of the known location reference points. This may be accomplished, without limitation, utilizing one or more computers and/or software. In such manner, the exact location and/or configuration of the inconsistency on the part may be determined.

In step 18, an image 25 of the inconsistency 23 may be displayed on the part 15. This step may be accomplished utilizing a laser projection device 27 by transforming the location coordinate data of the inconsistency into data that the laser projection device can read. In other embodiments, any type of device known in the art may be utilized in order to display the inconsistency image on the part, such as without limitation, plotting and/or printing the image 25 onto part 15.

The laser projection device 27 may display the image 25 on the part 15 by locating the known location reference points 13 on the part 15, and subsequently displaying the image 25 relative to known location reference points 13. In such manner, the image 27 may be displayed in the substantially correct location on the part 15. In other embodiments, the image 25 may be displayed or printed on the part 15 utilizing various methods to locate the image 25 on the part such as, but not limited to a plotter and/or a printer.

In step 20, the nature of the inconsistency may be better appreciated utilizing the image 25 of the inconsistency displayed on the part 15. The image 25 projection on the part may allow a person to see and appreciate and/or a machine to quantify the location where the part has inconsistencies. This may help with any inconsistency trimming needed, rework bond locating and sizing, and/or new or additional ply sizing, to name only a few examples. This may allow analysis and work on the part to be performed in less time, with more consistency, with less error, in a less difficult manner, and/or with less human interaction, and/or one or more other problems experienced with one or more of the prior art methods may be reduced.

In yet another embodiment, a part is provided which had a laser image of an inconsistency displayed on one or more surfaces of the part. The part may have been non-destructively scanned, such as ultrasonically scanned, and the inconsistency location may have been determined based on the non-destructive inspection. The coordinates of the inconsistency location may have been provided to a laser projection device which displayed the laser image of the inconsistency on the part. The part may be fabricated from metal and/or composite and/or ceramic material for an aircraft, a spacecraft, and/or other type of part such as a non-aeronautical part. The part may have been reworked based on the displayed inconsistency laser image.

It should be understood, of course, that the foregoing relates to exemplary embodiments of the disclosure and that modifications may be made without departing from the spirit and scope of the disclosure as set forth in the following claims.

We claim:

1. A method of displaying an image of an inconsistency on a part comprising:

determining locations of reflective markers located on said part utilizing at least one of a light emitting device and a laser emitting device to reflect at least one of a light beam and a laser beam off said reflective markers located on said part;

scanning said part utilizing a non-destructive inspection device to determine the inconsistency of said part;

locating the inconsistency of said part in X, Y, and Z coordinates by comparing data from the scanning of said part with the determined locations of the reflective markers located on said part; and displaying said image of said inconsistency on said part using at least one of a laser projection device to project the image of said inconsistency on said part using the located X, Y, and Z coordinates of said inconsistency and a printing device to print the image of said inconsistency on said part using the located X, Y, and Z coordinates of said inconsistency.

2. The method of claim 1 wherein said part is at least one of an aircraft part and a spacecraft part.

3. The method of claim 1 wherein said non-destructive inspection device comprises an ultrasonic scanning device.

4. The method of claim 1 wherein the locations of at least six references markers located on said part are determined.

5. The method of claim 1 wherein said reference markers comprise at least one of reflective tape and reflective targets.

6. The method of claim 1 wherein the determining said locations of said reflective markers located on said part utilizes the light emitting device comprising a photogrammetry device.

7. The method of claim 1 wherein the determining said locations of said reflective markers located on said part utilizes the laser emitting device comprising a laser tracker.

8. The method of claim 1 wherein the locating the inconsistency of said part utilizes at least one computer.

9. The method of claim 1 wherein the locating the inconsistency of said part comprises using at least one of hardware and software which determines said inconsistency location based on the scanning data showing an irregular shape of said part.

10. The method of claim 1 wherein said displaying said image of said inconsistency on said part utilizes the laser projection device to project the image of said inconsistency on said part using the located X, Y, and Z coordinates of said inconsistency.

11. The method of claim 1 wherein said displaying said image of said inconsistency on said part utilizes the printing device to print the image of said inconsistency on said part using the located X, Y, and Z coordinates of said inconsistency.

12. The method of claim 1 further comprising reworking said part utilizing said displayed image.

13. The method of claim 1 wherein said method is automated.

14. A part having an image of an inconsistency displayed on said part, wherein locations of reflective markers located on said part were determined utilizing at least one of a light emitting device and a laser emitting device to reflect at least one of a light beam and a laser beam off said reflective markers located on said part, said part was non-destructively scanned to determine the inconsistency of said part, said inconsistency on said part was located in X, Y, and Z coordinates by comparing data from the scanning of said part with the determined locations of the reflective markers located on said part, and the image of said inconsistency is displayed on said part using at least one of a laser projection device to project the image of said inconsistency on said part using the located X, Y, and Z coordinates of said inconsistency and a printing device to print the image of said inconsistency on said part using the located X, Y, and Z coordinates of said inconsistency.

15. The part of claim 14 wherein said part is at least one of an aircraft part and a spacecraft part.

16. The part of claim 14 wherein said part was reworked based on said displayed image.

17. The part of claim 14 wherein said image of said inconsistency is displayed on said part utilizing the laser projection device to project the image of said inconsistency on said part using the located X, Y, and Z coordinates of said inconsistency.

18. The part of claim 14 wherein said image of said inconsistency is displayed on said part utilizes the printing device to print the image of said inconsistency on said part using the located X, Y, and Z coordinates of said inconsistency.

19. The part of claim 14 wherein said reference markers comprise at least one of reflective tape and reflective targets.

20. The part of claim 14 wherein the determining said locations of said reflective markers located on said part utilized the light emitting device comprising a photogrammetry device.

21. The part of claim 14 wherein the determining said locations of said reflective markers located on said part utilized the laser emitting device comprising a laser tracker.

\* \* \* \* \*